United States Patent [19]
Young

[11] Patent Number: 6,026,099
[45] Date of Patent: Feb. 15, 2000

[54] PULSE FORMING X-RAY LASER

[75] Inventor: Chris M. Young, Jacksonville, Fla.

[73] Assignee: Tetra Corporation, Albuquerque, N.Mex.

[21] Appl. No.: 08/903,318

[22] Filed: Jul. 30, 1997

Related U.S. Application Data

[60] Provisional application No. 60/023,121, Jul. 31, 1996.

[51] Int. Cl.$^7$ ..................................................... H01S 3/30
[52] U.S. Cl. .................................. 372/5; 372/25; 372/81; 372/87
[58] Field of Search .................................. 372/5, 87, 76, 372/81, 25

[56] References Cited

U.S. PATENT DOCUMENTS

| | | | |
|---|---|---|---|
| 4,937,832 | 6/1990 | Rocca | 372/5 |
| 4,975,917 | 12/1990 | Villa | 372/5 |
| 5,394,411 | 2/1995 | Milchberg et al. | 372/5 |

OTHER PUBLICATIONS

Rocca, J.J., et al., "Discharge–Driven 46.9–nm Amplifier with Gain–Length Approaching Saturation," *IEEE Journal–Topics in Quantum Electronics*, vol. 1, No. 3, pp. 945–948 (Sep. 1995).
Rocca, J.J., et al., "Discharge–Pumped Soft–X–Ray Laser in Neon–Like Argon," *Phys. Plasma*, vol. 2, No. 6, pp. 2547–2554, (Jun. 1995).
Rocca, J.J., et al., "Demonstration of Discharge Pumped Table–Top Soft–X–Ray Laser," *Physical Review Letters*, vol. 73, No. 16, pp. 2192–2195 (Oct. 17, 1994).
Park, C.O., et al., "Recent Results on Development of a Table–Top Soft–X–Ray Laser," *Appl. Physics B*, vol. 58 pp. 19–22 (1994).
Rocca, J.J., et al. "Fast Discharge Excitation of Hot Capillary Plasmas for Soft–X–Ray Amplifiers," *Physical Review E*, vol. 47, No. 2, pp. 1299–1304 (Feb., 1993).

*Primary Examiner*—Leon Scott, Jr.
*Attorney, Agent, or Firm*—Rod D. Baker; Jeffrey D. Myers; Deborah A. Peacock

[57] ABSTRACT

A capillary discharge x-ray laser driven by a radial pulse forming line. Both Blumlein and transmission line configurations of the pulse forming line in single and multiple stage arrangements are presented.

19 Claims, 10 Drawing Sheets

PULSE FORMING X-RAY LASER

CROSS-REFERENCE TO RELATED APPLICATIONS

This application claims the benefit of the filing of Provisional application Ser. No. 60/023,121, entitled *Pulse Forming Line Driven Compact Soft X-Ray Laser*, filed on Jul. 31, 1996, and the specification thereof is incorporated herein by reference.

GOVERNMENT RIGHTS

The U.S. Government has a paid-up license in this invention and the right in limited circumstances to require the patent owner to license others on reasonable terms as provided for by the terms of Contract No. F19628-96-C-0095 awarded by Ballistic Missile Defense Organization (BMDO).

BACKGROUND OF THE INVENTION

Field of the Invention

1. Technical Field

The present invention relates to x-ray lasers and compact high power pulse forming line drivers for x-ray lasers and methods for producing short wavelength x-ray laser pulses.

2. Background Art

Future requirements for weapon effects testing will necessitate improvements in the current radiation source capability for soft x-rays. Furthermore, as man stretches the micro-limits of technology, shorter wavelength optical sources become a major limitation in the ability to fabricate more dense electronic circuits, look at smaller objects, or even break apart smaller building blocks. Although x-ray lasers were first demonstrated in plasmas generated in large laser facilities in 1984, widespread use of these sources have been limited due to their large size, high cost, and complexity.

As most of the markets require intense or high brightness source levels, there are two sources that are presently commercially available: synchrotrons and laser plasma sources. Synchrotrons cost about $25,000,000 with a facility cost of about $30,000,000. The laser based sources run from $800,000 to $3,000,000. Furthermore, neither of these two sources are coherent or provide a narrow line width or beam width.

Advances in many areas of effects simulation and optical processing require a radiation source which cannot be currently provided by any single available source, much less a table-top source. Simultaneous requirements for short wavelength (<500 Å), high intensity, narrow line, good collimation, small beam size, short pulse length, coherence, and high repetition rate have slowed or prevented advances in these fields.

Other approaches to develop a soft x-ray laser include line focusing a laser beam on a target, such as carbon, and achieving lasing in the recombining carbon plasma. Park, C. O., Polonsky, L., Suckewer, S., "Recent Results on Development of a Table-Top Soft X-ray Laser", Appl. Phys. B, vol. 58, p. 19, 1994. Imploding plasmas created by water pulse line machines have created the high plasma caricatures necessary to produce x-ray radiation, but the machines used to produce the plasma are very large and do not utilize the radial transmission line or Blumlein technology taught by the present invention.

Direct excitation of a plasma by a pulsed discharge may result in efficient x-ray production, but early efforts centered around very large pulsed power machines and suffered from plasma nonuniformity and instabilities. Rocca, et al, proposed (Rocca, J. J., Cortázar, O. D., Szapiro, B., Floyd, K., and Tomasel, F. G., "Fast-Discharge Excitation of Hot Capillary Plasmas for Soft X-ray Amplifiers", Physical Review, vol. E47, p. 1299, 1993) a scheme which promised to overcome these limitations by using fast discharge excitation of capillary channels to pump collisionally excited lasers. Rocca, et al, successfully demonstrated this scheme (Rocca, J. J., Shlyaptsev, V., Tomasel, F. G., Cortázar, O. D., Hartshorn, D., and Chilla, J. L. A., "Demonstration of a Discharge Pumped Table-Top Soft X-ray Laser", Physical Review Letters, vol. 73, p. 2192, 1994; Rocca, J. J., Tomasel, F. G., Marconi, M. C., Shlyaptsev, V. N., Chilla, J. L. A., Szapiro, B. T., and Giudice, G., "Discharge-Pumped Soft X-ray Laser in Neon-Like Argon", Phys. Plasmas, vol. 2, p.2547,1995; and Rocca, J. J, Marconi, M. C., Chilla, J. L. A., Clark, D. P., Tomasel, F. G., and Shlyaptsev, V. N., "Discharge-Driven 46.9-nm Amplifier with Gain-Length Approaching Saturation", IEEE Journal of Quantum Electronics, vol. 1, p.945, 1995) using an argon plasma generated in the devices shown in FIG. 1. This plasma lased at the 46.9 nm, J=0–1 line of Ne-like argon. The Marx generator (1) pulse charges the capacitor (7) formed by the two plates. The switch (2) is in series with the capillary discharge (3). When the switch fires, the energy stored in the water capacitor (7) is conducted as current through the switch (2) current through the capillary discharge (3) to pump the gas and produce x-ray lasing.

Rocca, et al, discovered that very fast risetime discharges are required for efficient x-ray laser operation, yet in the gain experiments they used capillary lengths of up to 12 cm. They used a discharge capacitance of 3 nfd. The problem of trying to drive long discharges is that the inductance increases linearly with the discharge length. The inductance of a coaxial discharge is given by:

$$L = \frac{\mu l}{2\pi} \ln \frac{r_2}{r_1}$$

where $l$ is the length of the discharge, $r_2$ is the outer radius of the current return, and $r_1$ is the radius of the discharge channel. If the current return radius is 2 cm and the discharge channel radius is 100 microns (note that the results are not very sensitive to these assumptions because of the logarithmic scaling), for a 1 cm long discharge, the inductance is 10 nH, which would result in an inductance limited current risetime of about 9 ns. A 12 cm discharge will result in an inductance 12 times greater (120 nH) for an inductive risetime limit of 30 ns. The pulse width changes from about 20 ns to over 60 ns by changing the discharge length. Certainly an unfavorable way to scale the laser if small current risetime is essential for efficient operation.

In addition, significant losses are apparent in the Rocca, et al, system. A typical current waveform is reproduced in FIG. 2. This is generated from the driver shown in FIG. 1. Note that significant ringing of the current waveform indicates poor matching between the circuit and the discharge. Since Rocca, et al's results indicate that lasing occurs primarily in the first current cycle, the energy ringing during the other cycles represents a significant system inefficiency. Furthermore, a ringing circuit places significant stresses on the system and is known to reduce the lifetime of such systems.

By analyzing the circuit and the wave forms we find that the inductance is about 39 nH and the charge voltage is about 430 kV which is substantially less than the 700 kV Marx voltage. The 39 nH is also substantially more than the coaxial discharge inductance calculated above (10 nH) and is due to other contributions to the inductance, especially the switch inductance.

The estimated resistance is shown in FIG. 3 and the voltage is shown in FIG. 4. And, by knowing the voltage and current, the time dependent power can be derived as shown in FIG. 5. If the power curve is integrated, the energy delivered by Rocca et al's pulsed power system is about 220 joules compared with 735 joules stored in the Marx bank. Furthermore, not all of this energy ended up in the laser discharge because the switch voltage drop dissipated some portion of the energy. Since the voltage drop (losses) in a gas discharge switch are proportional to the molecular weight of the switch, and the molecular weight of the switch gas was about 4 times the weight of argon, the switch losses may have been comparable with the argon discharge energy (assuming that the switch channel length was about 2.5 mm in length). That is, only about 100 joules may have gone into the argon discharge resulting in a peak power input of about 5 Gwatts and a peak voltage of only about 200 kV.

To summarize, there are at least four problem areas which will limit the future of this capillary discharge technology unless solved:
1. Poor power scaling due to discharge inductance;
2. Low energy transfer efficiency (<15%);
3. Factor of 3.5 voltage drop in the system; and
4. Ringing discharge reduces system lifetime.

The radial transmission line has been applied to the switched power linac as a means of creating high particle acceleration for low capital cost. The basic principles of operation and analysis have been developed for these applications and small scale laboratory tests have been conducted on the radial transmission line performance. However, the present invention is the first combining the radial pulse forming line, in either transmission line or Blumlein configuration, with a capillary discharge to produce an x-ray laser.

Finally, there are three types of lasers: a) those using a resonant cavity, b) the single ended mirror laser cavity, using amplified spontaneous emission and c) the mirrorless laser. The resonant cavity is formed by two mirrors with a gain region between them. One of the mirrors is semi-transparent. The light is reflected multiple times between the mirrors, with some of the light leaking out of the semi-transparent mirror. This type of cavity requires high reflectivity from the mirrors to avoid high losses. The single ended cavity is similar to the resonant cavity with the semi-transparent mirror removed. The light can traverse the gain region at most twice with this configuration. This laser removes the requirement for a semi transparent mirror, for which materials technology may not be available in certain circumstances, such as x-ray lasers. This laser requires high gain from the gain medium to provide efficient power extraction from the gain medium. The mirrorless laser does not use any mirrors, but achieves geometric confinement of the beam by the geometry of the gain region. This laser requires higher gain than the single mirror laser because of the lack of light reflection and multiple passes through the gain medium. This laser results in light output from both ends. This laser is very attractive for x-ray lasers because of the difficulty of fabricating mirrors at soft x-ray wavelengths.

SUMMARY OF THE INVENTION

DISCLOSURE OF THE INVENTION

The present invention is of a capillary discharge x-ray laser apparatus comprising a radial pulse forming line driving the laser apparatus. In the preferred embodiment, the radial line is a Blumlein pulse forming line or a transmission line pulse forming line. Multiple pulse forming lines (preferably Blumlein) may be staged in parallel, or be coupled and feed discrete plasmas optically coupled to produce a single x-ray pulse. One or more self-break or triggered (as by a radiation source) switches may be used to fire the pulse forming line. A compressed, high temperature plasma conducive to the creation of x-rays may be created in a laser cavity, such as a super radiant cavity without mirrors or a fully resonant cavity with at least two sets of mirrors, at least one set of mirrors comprising an output coupler and at least one other set of mirrors comprising a reflecting mirror, preferably wherein the mirrors each comprise a single-ended cavity with one reflecting mirror with no output coupler.

The invention is also of a method of producing an x-ray laser pulse comprising: providing a capillary volume fitted with electrodes and filled with a gas suitable for x-ray lasing; providing a source of electrical current to capillary electrodes, wherein the current is azimuthally symmetric about a capillary discharge axis; switching a pulse forming line to initiate current flow to a capillary discharge; and switching the current into the capillary discharge. In the preferred embodiment, the source of electrical current is a radial Blumlein pulse forming line or a transmission line pulse forming line. Providing current to a capillary discharge preferably comprises providing a Blumlein pulse forming line with switches on one capacitor at a periphery. Switching a pulse forming line to initiate current flow to the capillary discharge comprises providing self-break switches and increasing charge voltage above a self-break limit or providing triggered switches and providing a trigger signal to the switches. Multiple pulse forming line stages may be aligned to simultaneously pump a single laser cavity.

A primary object of the present invention is to provide a pulse forming x-ray laser.

A primary advantage of the present invention is its low cost, size, and complexity.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

BEST MODES FOR CARRYING OUT THE INVENTION

The present invention is of a capillary discharge x-ray laser driven by a radial pulse forming line, instead of the more conventional pulse forming lines used in current state-of-the-art tabletop x-ray lasers. The radial pulse forming line permits higher peak current delivered to the capillary discharge, at lower inductance and higher energy transfer efficiency. Both Blumlein and transmission line configurations of the pulse forming line in single and multiple stage arrangements are presented by the invention. The higher performance of the radial pulse forming line x-ray laser, especially with the Blumlein variant enables x-ray lasing at shorter wavelengths with higher efficiency than conventional capillary discharge x-ray lasers.

To overcome the disadvantage of the power scaling or inductance with length, the system is preferably modularized. The system thus preferably comprises multiple discharge sections each with a nominal length of, for example, 2 cm. The sections can be combined in series to provide effective gain lengths equivalent to long discharges without the disadvantage of increased inductance. Furthermore, the modularization allows more flexible commercialization and characterization of the laser. Each section or module has a physical register so that the optical path of each section is precisely aligned.

The present invention incorporates a driver for table top x-ray sources based upon a radial pulse forming line topology. This topology offers high energy storage density, short pulse width, high voltage gain, and extremely high power pumping, and so is capable of delivering pulsed powers which are nearly an order of magnitude greater than existing capillary discharge x-ray laser systems. Furthermore, there is no debris emission which can damage or contaminate the experiment. Besides being useful for effects simulations, the source can also be used for diagnostics of others sources. For example, the soft x-ray laser can be used to probe the dense plasmas of conventional x-ray sources.

Figure 1:
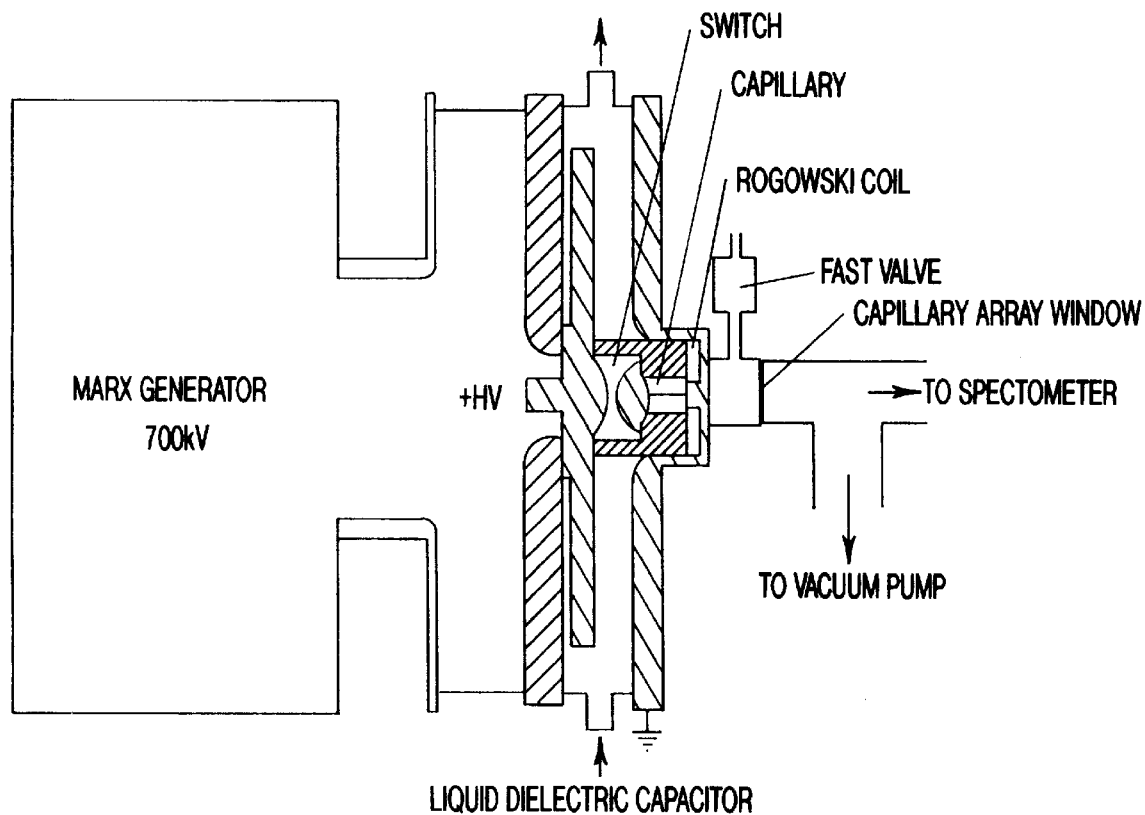
FIG. 1 is an illustration of a prior art soft x-ray system.
Figure 2:
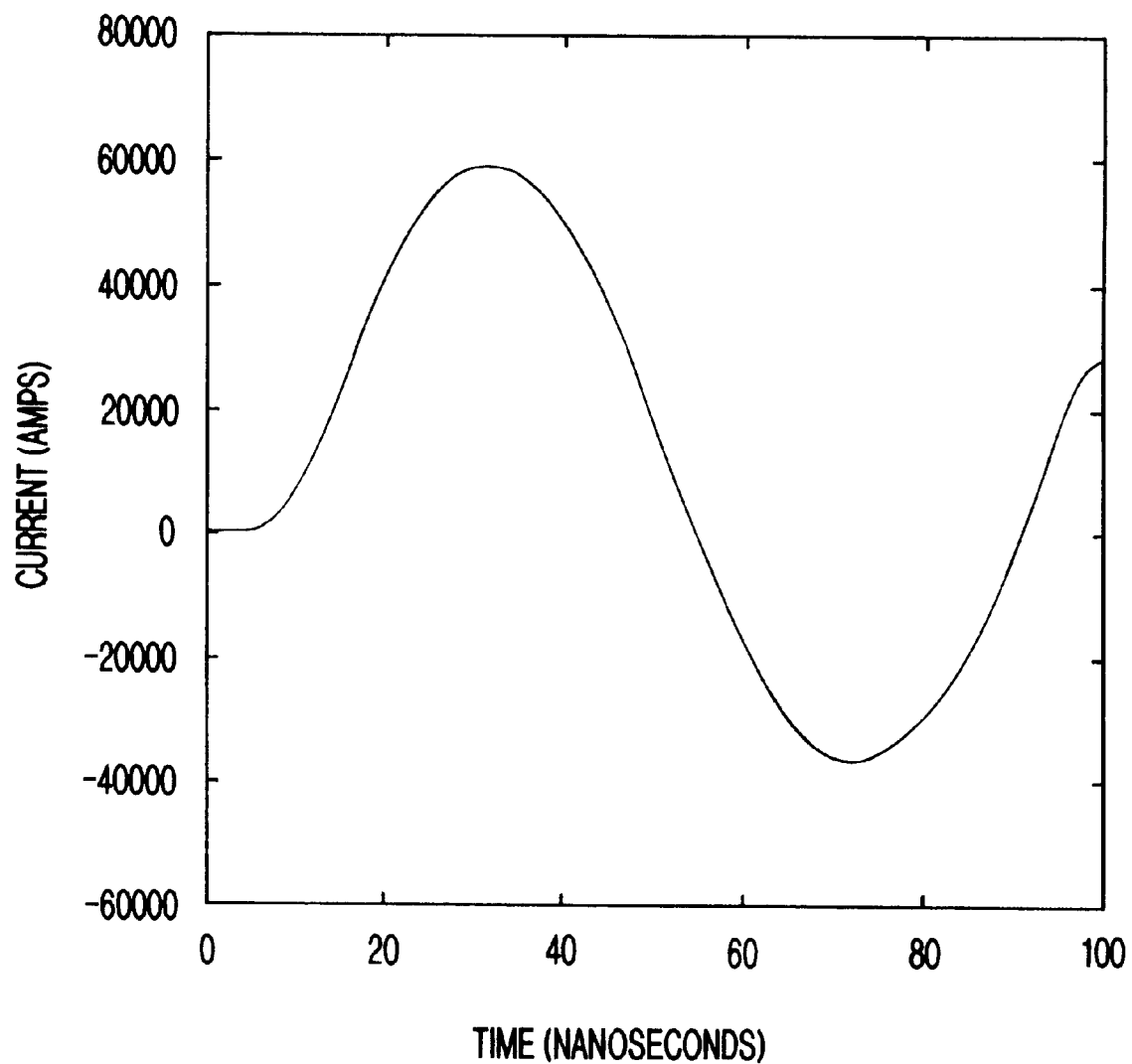
FIG. 2 shows the typical current pulse as measured by the Rogowski coil from a 1 cm long argon capillary discharge from the system of FIG. 1.
Figure 3:
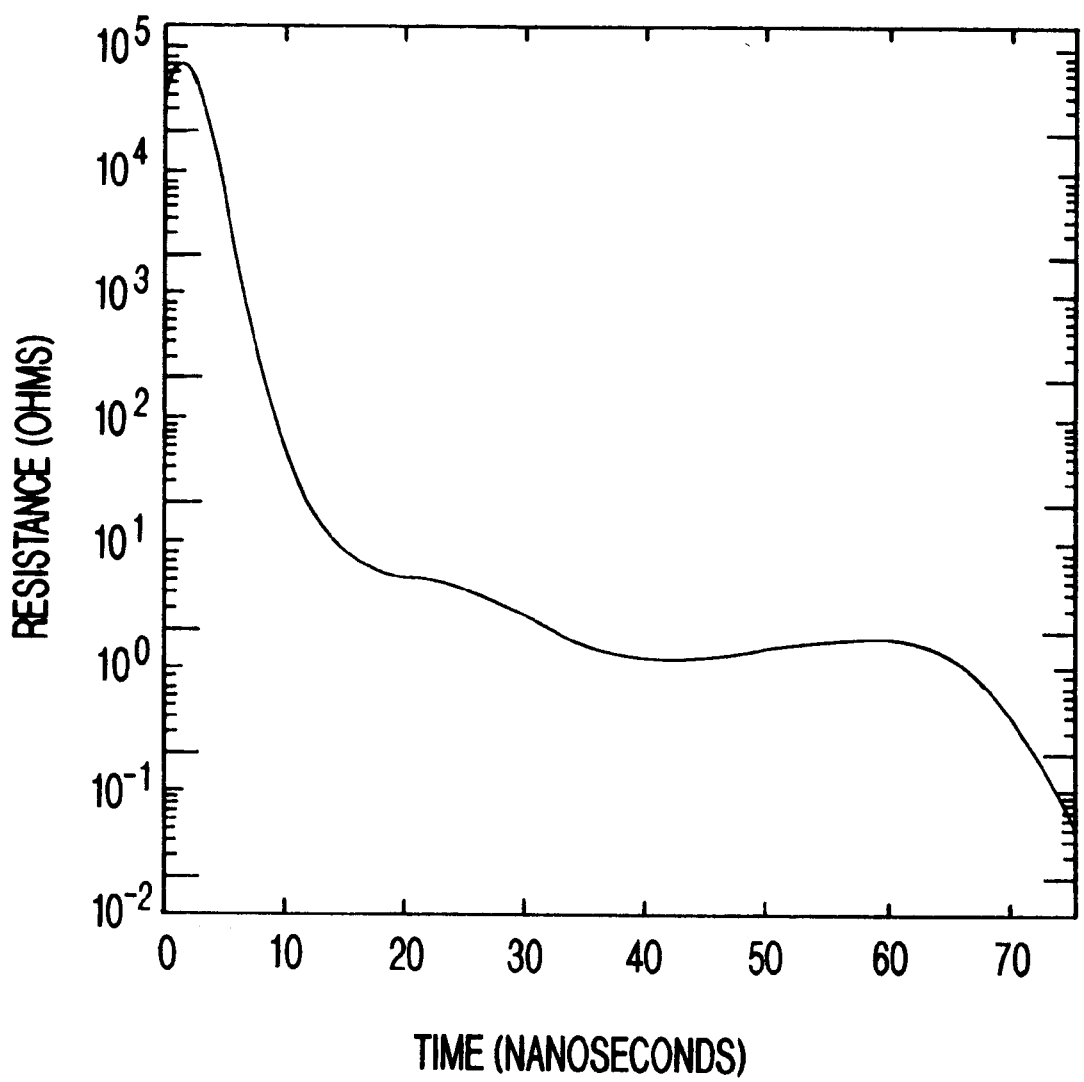
FIG. 3 shows the derived resistance for the system of FIG. 1 based on the FIG. 2 data.
Figure 4:
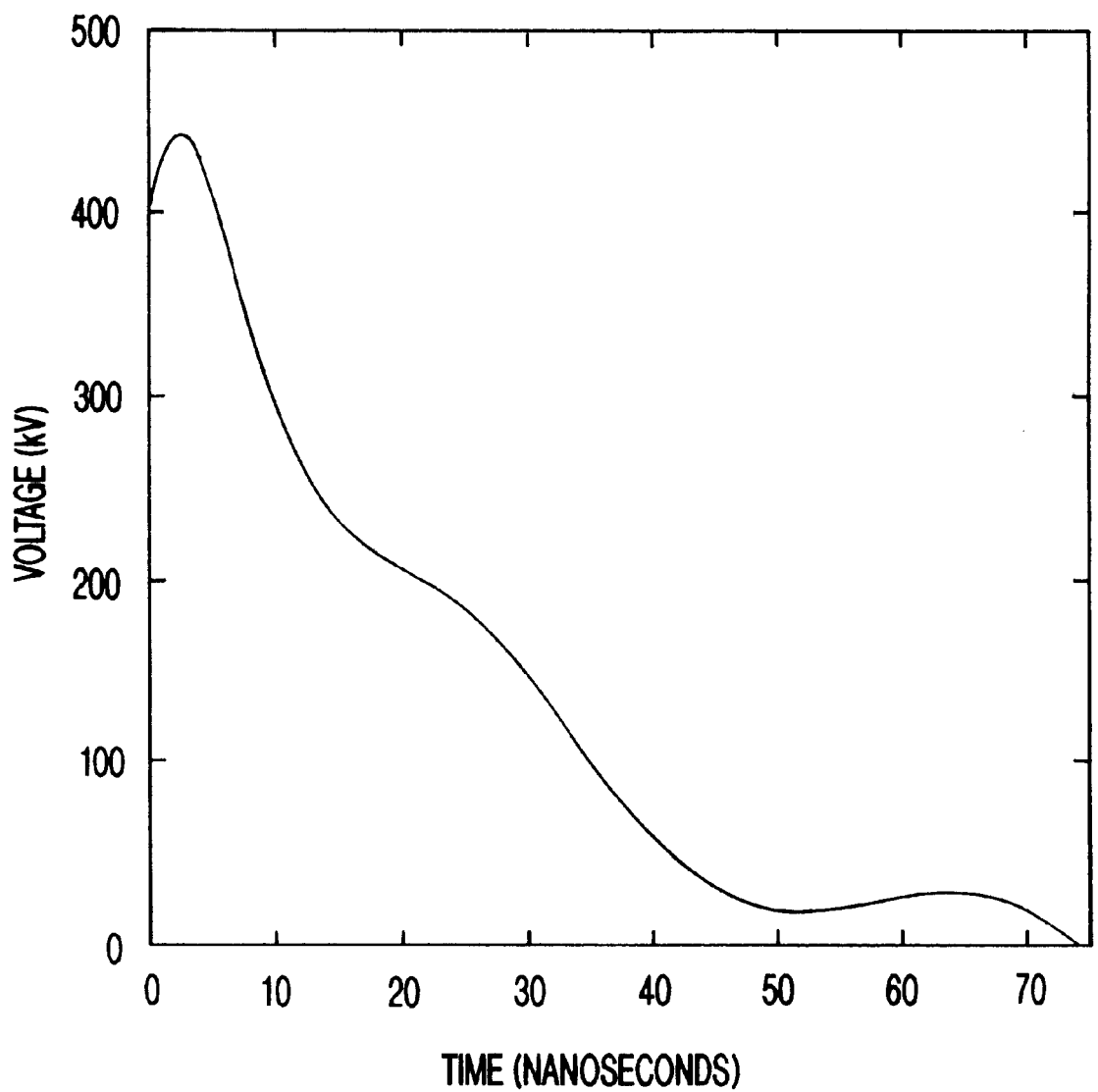
FIG. 4 shows the derived voltage from FIG. 2.
Figure 5:
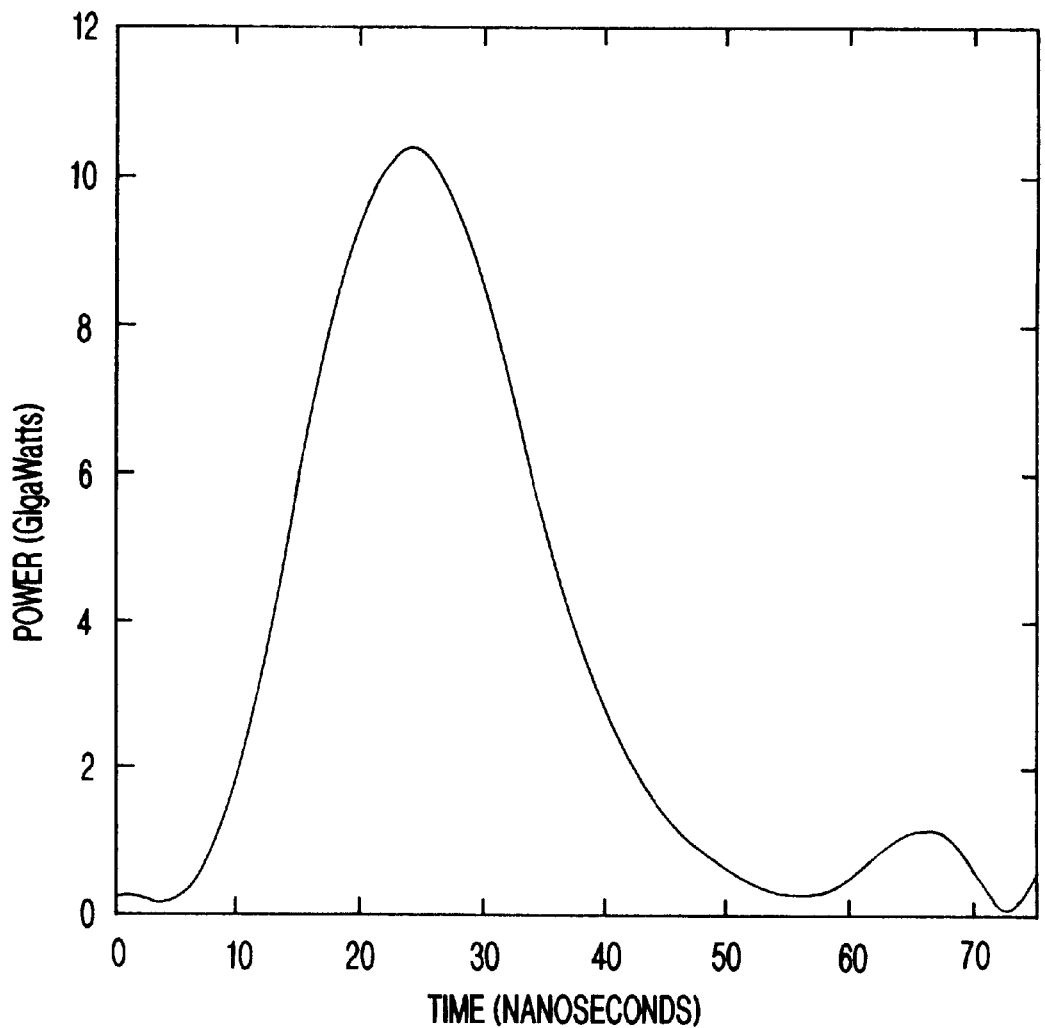
FIG. 5 shows the derived peak power from FIG. 2.
Figure 6:
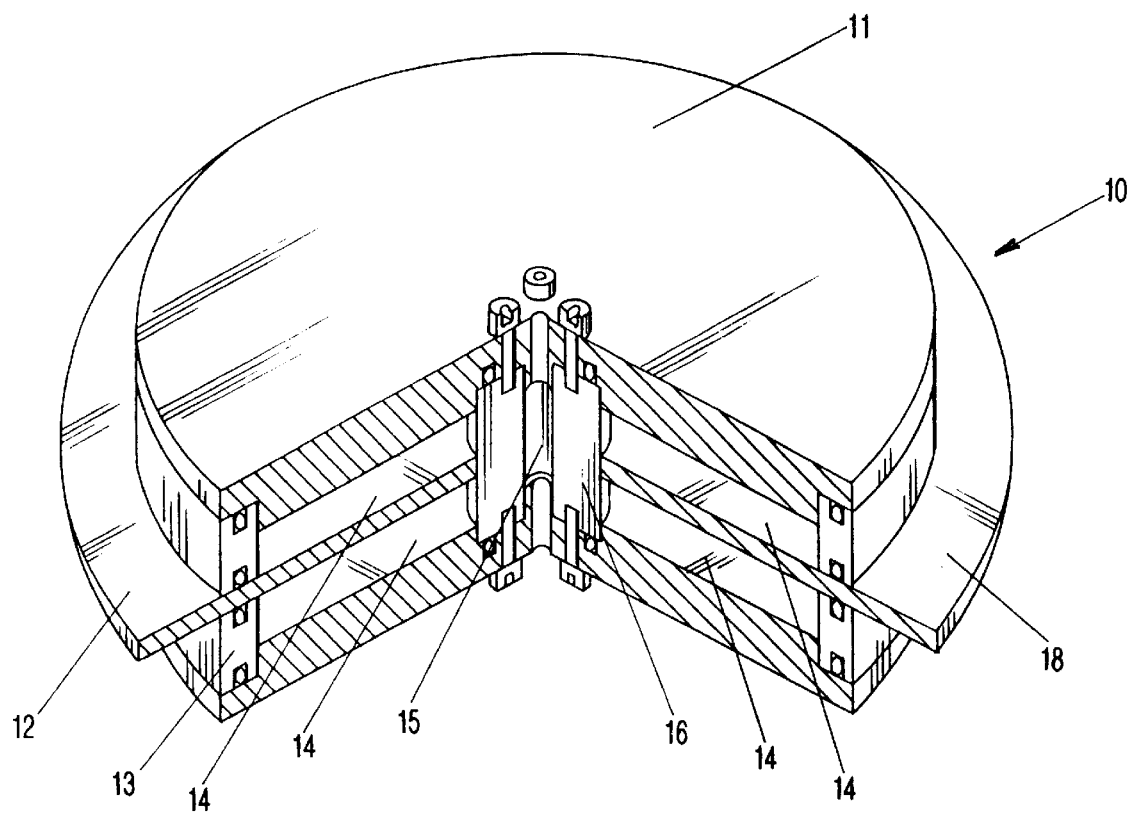
FIG. 6 is a cutaway view of the x-ray source of the invention.

FIG. 6 shows the cutaway view of the single stage radial Blumlein capillary discharge x-ray laser (10) of the invention. The device consists of top and bottom current conduction plates (11) separated from a center charge electrode (12) by insulators (13). The space between the electrodes is filled with a dielectric liquid (14), e.g., water, to provide the energy storage. Connected to the current conduction electrodes (11) is the discharge region (15) confined by the capillary structure (16). The edge switches (18) are located near the insulator.

The radial transmission line pulse forming line is similar to the Blumlein, except only two plates are utilized instead of three plates. In concept, the center feed plate (12) of FIG. 6 is not present. The high voltage is impressed on one plate with the other plate at ground potential. This requires a switch in series with the discharge, since the charge voltage is now impressed across the discharge, prior to firing. This is a significant disadvantage compared to the Blumlein pulse forming line wherein the voltage does not appear across the discharge until lasing is desired. Also, the series switch contributes significant inductance to the circuit and limits power deposition in the plasma. The advantage of the radial transmission line is that it provides a source impedance lower by a factor of two over the Blumlein transmission line for the same outside plate separation.

Figure 7:
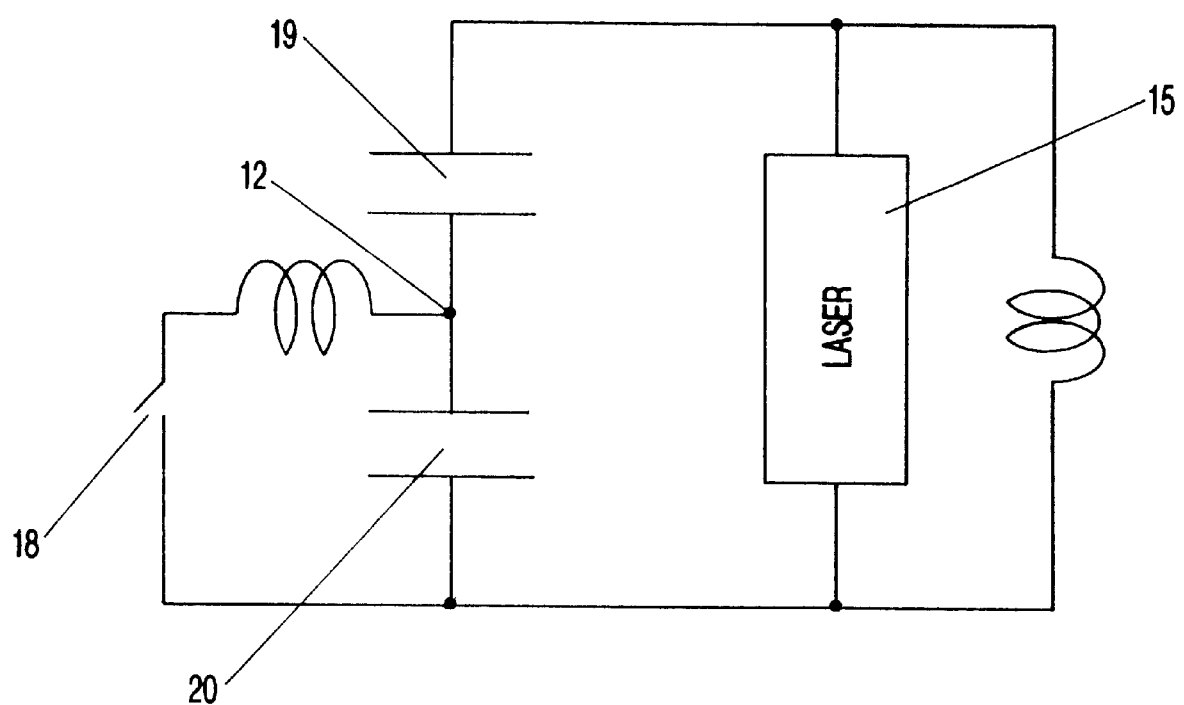
FIG. 7 is a simplified schematic of the topology of the x-ray source of the invention.

The operation of the invention is best illustrated by the equivalent circuit shown in FIG. 7. The capacitors (19 and 20) are pulse charged by an external source such as a Marx bank. The capacitors (19 and 20) are initially charged at their effective center point (12) with a result of zero voltage across the laser. When the switch is fired (18), the polarity of the lower capacitor (20) is reversed and the voltages of the capacitors add across the laser discharge (15). That is, if the capacitors (19 and 20) are charged to, say 300 kV, after the switch (18) fires, the voltage across the Blumlein rises to 600 kV. Note that when the laser discharge (15) breaks down and begins to conduct current, the switch (18) is not in the current path for the laser. The switch (18) serves only to reverse the voltage across the lower capacitor (20).

The two capacitors (19 and 20) share a common electrode connection (12) between them, as common electrode plate in a triplate capacitor as shown in FIG. 6. The center plate (12) is charged by a circuit such as a Marx bank (not shown) or transformer step up stage. The center plate (12) is then rapidly connected to one of the outer electrodes (18) causing a voltage reversal wave to travel toward the center of the radial line. Just a few switches along the periphery of the line are needed because the radial transmission line geometry is inherently forgiving of edge initiated perturbations. That is, edge initiated signals spread out rapidly around the periphery of the radial line and appear quite symmetric when they arrive at the center. The switch is not in series with the laser discharge and therefore does not significantly reduce the power transfer from the capacitor to the laser.

Figure 8:
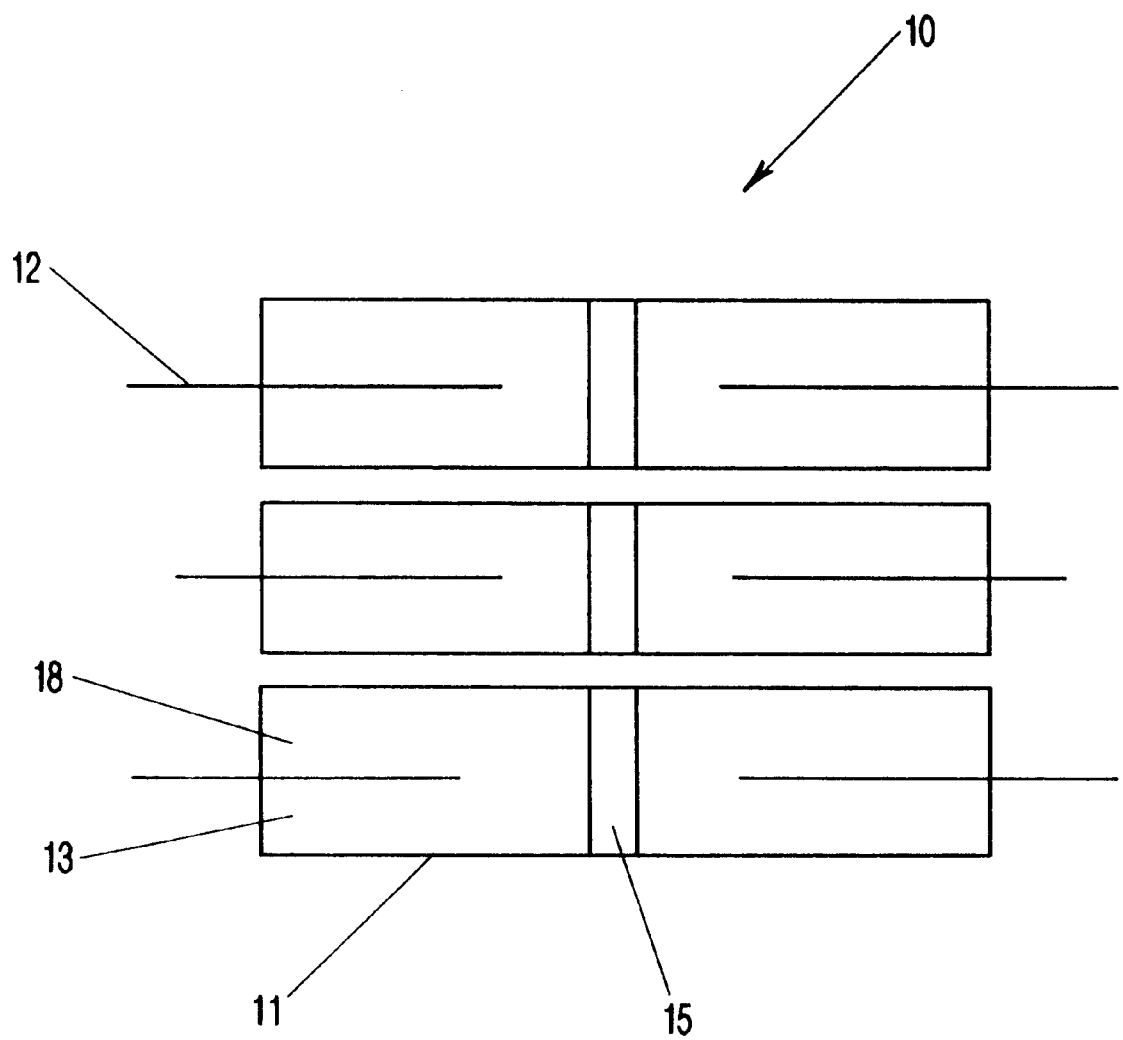
FIG. 8 shows the modular x-ray source of the invention.

To overcome the disadvantage of the power scaling or inductance with length, the system is preferably modularized. The system can be made up of discharge sections each with a nominal length of, for example, 2 cm as shown in FIG. 8. The sections can be combined in series to provide effective gain lengths equivalent to long discharges without the disadvantage of increased inductance. Furthermore, the modularization allows more flexible commercialization and characterization of the laser. Each section or module has a physical register so that the optical path of each section is precisely aligned.

Many variations on switches can be used. Solid dielectric switches which are triggered using wire bridge detonators are preferred. These triggers have timing jitters of a few ns and the risetime of the solid dielectric switches can be less than 1 ns. These switches are attractive because they are high performance and very low cost. Commercially available, high pressure hydrogen switches can also be used for the edge switch. These switches have ps risetimes and can be operated repetitively. Self-break water switches can also be used.

As the reversal or erection wave travels toward the center, it also increases in amplitude due to the transformer action of the radial line. The voltage multiplication is given by:

$$\frac{Vo}{Vr} = 2\sqrt{\frac{2R}{s + ct_r}}$$

where Vo is the voltage at the center once the wave arrives, R is the outer radius of the line, s is gap between the center and outer plate, c is the wave speed in the line, and $t_r$ is the risetime from the switch. If water is used as the dielectric, c is about 3.35×107 m/s. If a radial triplate line is with an outer radius of 23 cm, a 1 cm plate separation, and a switch that has a risetime of about 5 ns, then the voltage gain due to the radial geometry is a factor of 3.2. Combined with the inherent factor of 2 gain for a Blumlein, the total voltage gain is 6.4. Thus, a charge voltage of 300 kV results in voltage across the laser of nearly 2 MV. This is an order of magnitude greater voltage than the estimate for the Rocca, et al, system with a factor of two less charge voltage. The topology of the present invention results in a voltage gain that is more than 20 times greater than the Rocca, et al, system.

Water is often used as a dielectric because it is inexpensive, and has a high energy storage density. With a relative dielectric constant of 80 it is the most cost effective energy storage dielectric. One problem with water, though, is that it cannot hold a voltage for a long period of time. The holdoff time for water is given by:

$$t_{eff} = \left[\frac{0.5}{E_{max} A^{\frac{1}{10}}}\right]^3$$

where $t_{eff}$ (in microseconds) is the effective time that the field exceeds 63% of $E_{max}$ (in MV/cm), and A is the capacitor plate area (in cm$^2$). If a geometry is used that stores about 1 kJ, at 300 kV the plate area is about 3300 cm$^2$ (23 cm radius) with a 1 cm gap. The effective time before breakdown is more than 400 nanoseconds. That is, a Marx bank is used to pulse charge the system in about 400 nanoseconds without failure of the water dielectric.

Such a system according to the invention delivers a pulse of about 14 ns in duration (a two way pulse transit distance of 2×23 cm at 3.35×107 m/s) to the laser discharge. If 75% of the stored energy, or 750 J is delivered to the plasma, it results in a pump power of more than 54 GigaWatts. This is a factor of 10 times greater than the power delivered by the Rocca, et al, system.

An added benefit of the present invention is that the impedance of the driver as a function of time can be modified to better match the discharge. By adjusting the separation between the plates as a function radius, the driver impedance as a function of time can be programmed to match the collapsing discharge impedance. This can lead to the reduction of the circuit ringing and the associated inefficiencies and lifetime improvement.

Figure 9:
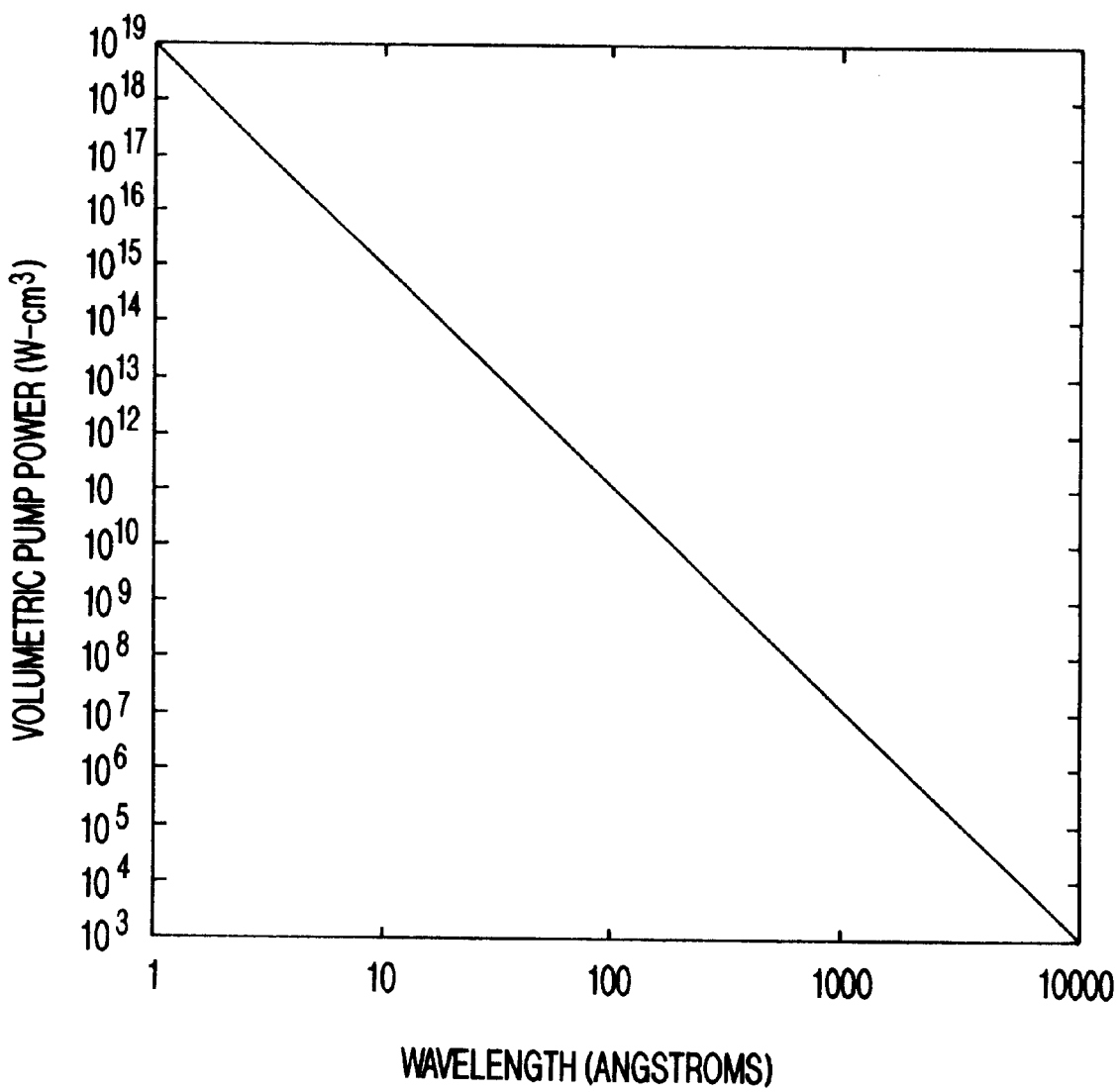
FIG. 9 shows the approximate volumetric pump power of the invention as a function of wavelength.

The high peak power of the laser of the present invention enables access to shorter wavelength on laser transitions than converted table top x-ray lasers. FIG. 8 shows the volumetric pump requirements as a function of extracted laser wavelength. According to Rocca, et al, the capillary discharge collapses to a diameter of 200 to 300 microns. If the discharge is 250 microns in diameter and 2 cm long, the present invention can pump about 5×10$^{13}$ W/cm$^3$. As shown in FIG. 9, this allows laser line generation down to about 20 Å.

Furthermore, McPherson, et al, McPherson, A., Boyer, K., and Rhodes, C. K., "X-ray Superadiance from Multiphoton Excited Clusters", J. Phys. B, vol. 27, p. L637, 1994, has indicated that clusters of atoms may provide a gain in efficiency in producing x-rays. McPherson indicates that the threshold power flux is on the order of 10$^{17}$–10$^{19}$ W/cm$^2$ which is in the achievable range of the present invention. McPherson's results indicate cluster pumping results in an efficiency increase by more than an order of magnitude.

The edge switched radial Blumlein is the ideal driver for axially pumped plasma discharges. The discharge is located in the center of the driver so that current is symmetrically fed into the discharge. This helps insure that the plasma formation and compression is uniform. The Blumlein configuration provides a voltage doubling allowing a lower charge voltage and the resulting lower insulation requirements. The edge switched Blumlein configuration provides an additional voltage multiplication due to the transformer action of the radial line. In this configuration, the radial line provides a factor of >4 ring up in voltage and combined with the Blumlein voltage doubling leads to a voltage ring up across the discharge of more than a factor of 8 when compared to the charge and switching requirements. That is, the Blumlein can be charged to, e.g., 300 kV and deliver more than 2.4 megavolts to the discharge. Because of the nature of the radial line, it is relatively insensitive to timing inaccuracies in the edge switches and because of the Blumlein configuration, the trigger switch is not in series with the plasma discharge. This means that the trigger switch does not limit the current through the plasma discharge as is the case with the Rocca, et al, design. The result is a much more efficient pumping process.

The present invention has at least the following improvements to the state of the art:
1. Projected factor of 10 improved performance;
2. Compact size;
3. Low cost;
4. Rugged design; and
5. High power pumping.

The present invention increases the performance of soft x-ray sources. Such gains in performance coupled with compact technology provides a table top, commercial x-ray laser.

Industrial Applicability:

The invention is further illustrated by the following non-limiting examples.

EXAMPLE 1

Figure 10:
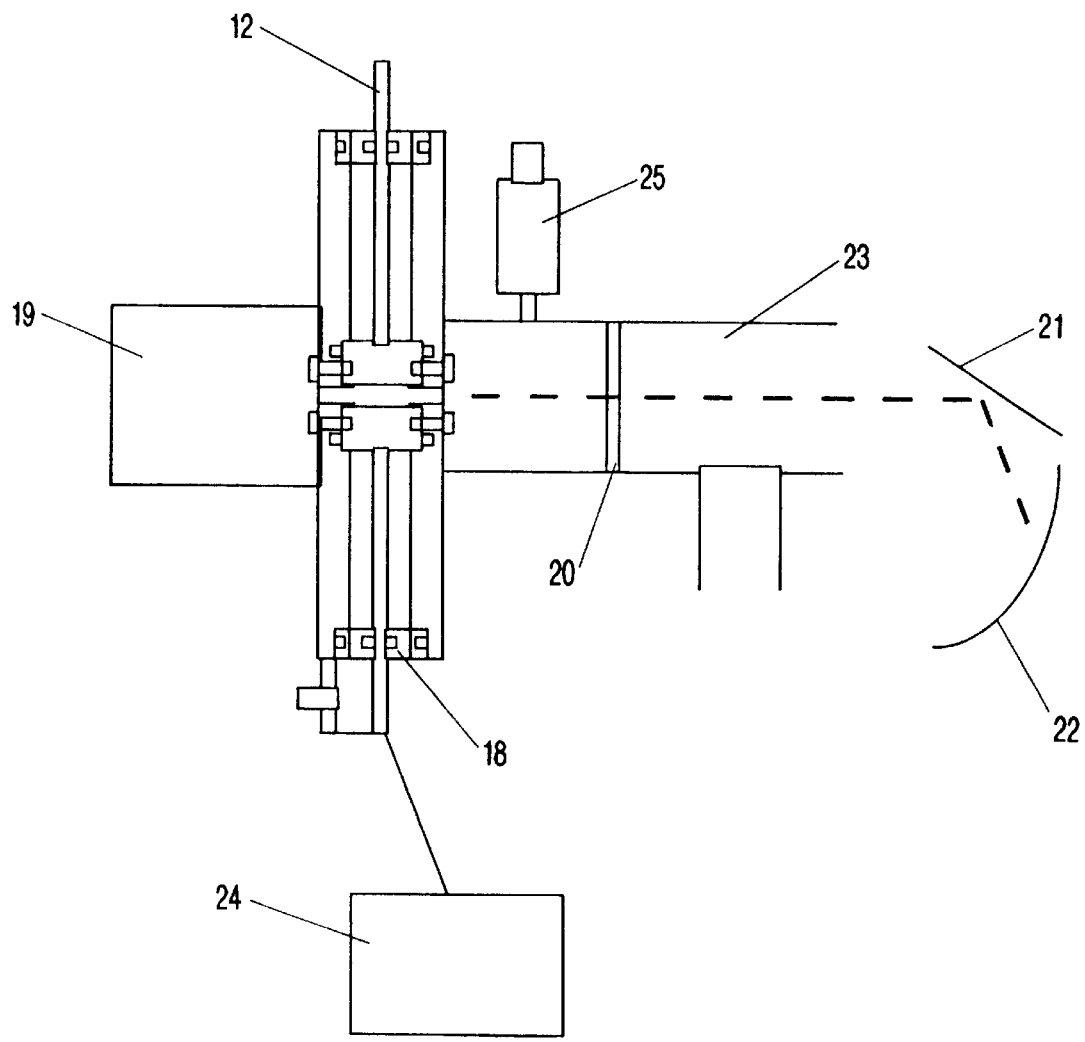
FIG. 10 shows an embodiment of the system of the invention used in experiments.

FIG. 10 shows the embodiment of this device in an experimental facility. The Marx Bank (24) is used to pulse charge the center electrode (12). Self-break water gap switches are used to fire the device (18). A preionizer is utilized to preionize the gas column (19). A window (20) is used to separate the discharge section from the diagnostic section, which includes a grating (21) and x-ray sensitive film (22). A drift tube (23) is utilized to extract the x-ray laser light prior to distruption of the diagnostic region by expansion of the discharge plasma.

The present invention, as described above, has an unerected capacitance of 11 nfd and an erected capacitance of 5.5 nfd. It has a bore diameter of 4 mm. The preionizer is one of several configurations including UV flashlamp, electric spark, or miniature e-gun.

The gas/vacuum system allows injection of xenon gas puffs using a fast gas valve (25), and differential pumping across a capillary window for a vacuum beam train for the x-ray emission. A gold coated grating is used to form a 2 m spectrometer and x-ray sensitive film is used to record the x-ray spectrum.

EXAMPLE 2

Many applications exist for a table top x-ray laser in scientific laboratories in applications in basic atomic physics such as: photoexcitation and photoionization, multiple photoionization, photo-population of excited states, resonance absorption and fluorescence, and even miniature electron accelerators in crystals.

Electron Spectroscopy for Chemical Analysis (ESCA) is a nondestructive chemical analysis technique which is used to determine elemental composition and chemical state of the surface of a specimen. Although 10 Å is below the limit for direct pumping with the present invention, nonlinear techniques can be combined with the present invention to achieve these wavelengths. The small beam diameter of the RadBlum allows for microprobing.

Short wavelength photons can be used to probe high density plasmas for fusion and simulator work. Because these plasmas have cutoff frequencies in the x-ray region, x-ray sources are needed to probe these plasmas. For example a 100 Å beam is required to probe plasma densities of $10^{25}$ cm$^3$. With short wavelength lasers, nuclear decay processes can be investigated including probing and controlling decay processes. Because of their high intensities, x-ray lasers are essential for these applications. Very high resolution gratings and grids can be fabricated with x-ray lasers. The resulting gratings and grids have very low defects and provide groove spacings that are not achievable with other means.

Photolithography is perhaps one of the strongest markets for x-ray lasers. The availability of intense x-ray sources allow for production of very dense electronic circuits and reduce defect rates. One of the determining factors for considering x-ray lasers is the minimal line resolution as a function of depth of focus. The relationship for depth of focus is:

$$DOF = \frac{W_{min}^2}{\lambda}$$

where $w^2_{min}$ is the minimum line width and $\lambda$ is the wavelength. A depth of focus of about 1 micron is necessary for most lithography applications. For the argon line described above (47 nm), the minimum line resolution is about 0.2 microns. Shorter wavelengths result in finer line resolutions.

Photoelectron spectroscopy of a surface using x-ray lasers is an important tool for determining the presence of specific atomic species, structural arrangements, and depth of diffusion.

X-ray lasers allow the development of x-ray microscopy which can be used to view living cells with high magnification and resolution. As the wavelength approaches 20 Å, high contrast microscopy is possible due to the "water window". By using a coherent source, x-ray holography can be used for multidimensional viewing of specimens. Because the laser can produce small beams, x-ray lasers can open up entirely new markets in biomolecular crystallography.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A capillary discharge x-ray laser apparatus including a radial pulse forming line, comprising:

a substantially cylindrical discharge region confined by a capillary structure to enhance concentration of electrical current along an axis of said discharge region to induce lasing therein at x-ray wavelengths, said discharge region having a length substantially greater than its radius to confine laser beam divergence;

wherein said radial pulse forming line comprises at least two conduction plates, substantially parallel to each other and having a dielectric material therebetween, disposed substantially perpendicular to said axis and at least partially surrounding said discharge region, at least a first one of said conduction plates electrically connected to said capillary structure; and means for switching a voltage impressed across two of said conduction plates to deliver a voltage pulse via said pulse forming line to said discharge region.

2. An apparatus according to claim 1 wherein said pulse forming line comprises a Blumlein pulse forming line, said apparatus further comprising a center charge plate disposed parallel between two of said conduction plates and around said discharge region; and wherein said switching means comprises means for providing electrical connection between said center charge plate and one of said conduction plates.

3. An apparatus according to claim 1 comprising a plurality of said x-ray laser apparatus combined in parallel to each other.

4. An apparatus according to claim 1 wherein said switching means comprises means for electrically connecting a second one of said conduction plates to said capillary structure.

5. An apparatus according to claim 1 comprising a plurality of said x-ray laser apparatus coupled together and feeding discrete plasmas optically coupled together to produce a single x-ray pulse.

6. The apparatus of claim 1 wherein said switching means comprises at least one self-break switch.

7. The apparatus of claim 1 wherein said switching means comprises at least one triggered switch.

8. The apparatus of claim 7 wherein said at least one switch is triggered by a radiation source.

9. The apparatus of claim 1 additionally comprising a laser cavity defined in part by at least one mirror and means for creating a compressed, high temperature plasma in said laser cavity.

10. The apparatus of claim 9 wherein said laser cavity comprises a fully resonant cavity with at least two sets of mirrors, at least one set of mirrors comprising an output coupler and at least one other set of mirrors comprising a reflecting mirror.

11. The apparatus of claim 9 wherein said laser cavity comprises a single-ended cavity having only one reflecting mirror.

12. The apparatus of claim 1 further comprising a super radiant laser.

13. A method of producing an x-ray laser pulse, the method comprising the steps of:

a) providing a capillary volume fitted with electrodes and filled with a gas for x-ray lasing;

b) providing a source of electrical current to capillary electrodes, wherein the current is azimuthally symmetric about a capillary discharge axis;

c) switching radial a pulse forming line to initiate current flow to a capillary discharge; and d) switching the current into the capillary discharge.

14. The method of claim 13 wherein the step of providing a source of electrical current comprises providing a radial Blumlein pulse forming line.

15. The method of claim 13 wherein the step of providing a source of electrical current comprises providing a radial transmission line pulse forming line.

16. The method of claim 13 wherein the step of providing current to a capillary discharge comprises providing a Blumlein pulse forming line with switches on one capacitor at a periphery of said capacitor.

17. The method of claim 13 wherein the step of switching a pulse forming line to initiate current flow to the capillary discharge comprises providing self-break switches and increasing charge voltage above the limit of said self-break switches.

18. The method of claim 13 wherein the step of switching a pulse forming line to initiate current flow to the capillary discharge comprises providing triggered switches and providing a trigger signal to the switches.

19. The method of claim 13 additionally comprising the step of providing multiple pulse forming line sections physically registered in series and having optical paths aligned.

* * * * *